E. SANFORD.
Modes of Securing Wheel-Hubs to Shafts.

No. 143,849. Patented Oct. 21, 1873.

UNITED STATES PATENT OFFICE.

EDWIN SANFORD, OF HARTFORD, CONNECTICUT.

IMPROVEMENT IN THE MODES OF SECURING WHEEL-HUBS TO SHAFTS.

Specification forming part of Letters Patent No. 143,849, dated October 21, 1873; application filed July 19, 1873.

*To all whom it may concern:*

Be it known that I, EDWIN SANFORD, of Hartford, in the county of Hartford and State of Connecticut, have invented a new and useful Improvement in Wheel-Hubs, of which the following is a specification:

For fastening pulleys, cog-wheels, &c., on the shafts in a way to save the expense of boring the hubs, turning the shafts, and fitting the wheels to the shafts, I propose to cast the wheels with their holes a little larger than the shafts, and with three or more grooves in said holes, in which I fit gibs or keys, on which I secure the wheels and true them to the shafts by set-screws screwing through the hubs and clamping the gibs on the shafts.

Figure 1:
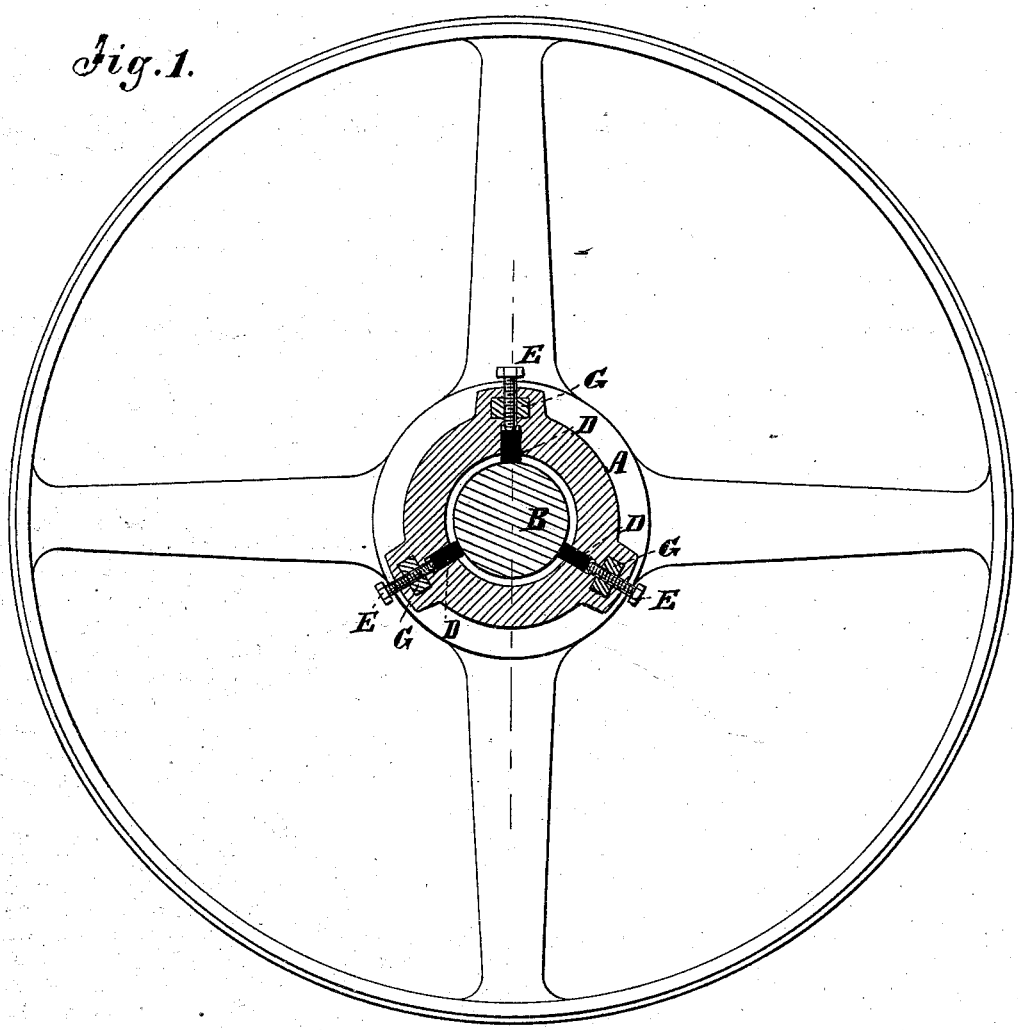
Figure 2:
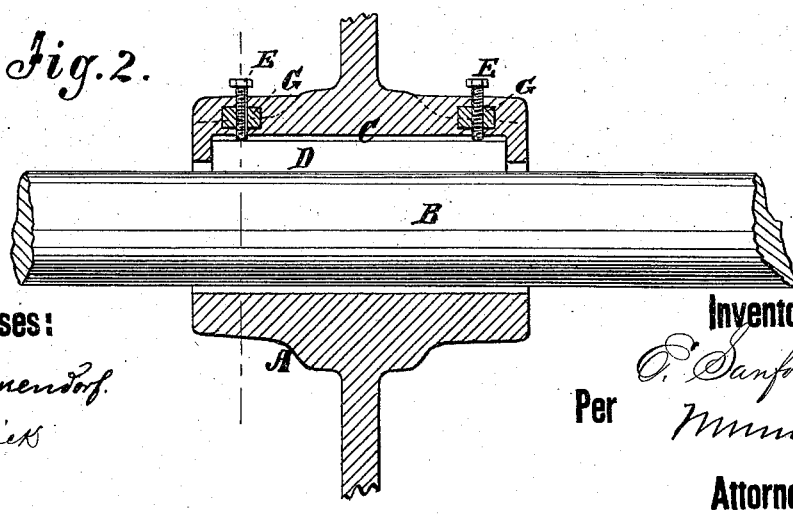

Figure 1 is a transverse section of a pulley and shaft secured according to my improved plan, the section being taken on the line $x\ x$ of Fig. 2; and Fig. 2 is a longitudinal section taken on the line $y\ y$ of Fig. 2.

A represents the hub of a driving-pulley, and B the shaft on which it is mounted. I make the hole in the hub a little larger than the shaft, and also make three or more recesses or grooves, C, in the wall of the hole at equal distances apart, said grooves being radial to the axis, and, by preference, terminating at the ends a little short of the ends of the hub; but they may extend the whole length, if preferred. D represents gibs, which I fit in the grooves to bind the wheel on the shaft by set-screws E screwing through the hub against them. For these screws I provide wrought-iron nuts G, which I incorporate with the metal of the hub by arranging them in the mold and casting the metal upon them, using suitable cores to prevent the holes from filling and to form coinciding holes for the screws in the metal surrounding the nuts.

When the grooves do not extend the whole length of the hub, the gibs will have to be put in said grooves before the wheel is put on the shaft.

By this plan I not only save the expense of boring the wheel and fitting the shaft, but I can most readily adjust the wheel or pulley to any part of a long, rough, and uneven shaft. I can also true it on a shaft that is sprung without removing the shaft; and I can readily release it to take it off after it has been so long in position as to make it very difficult to remove when fastened in the ordinary way.

Having thus described my invention, I claim—

The screws E, nuts G, and gibs D combined, as described, with the hub A, having three or more radial and equally-distant inside grooves, C, as and for the purpose described.

EDWIN SANFORD.

Witnesses:
H. S. BARBOUR,
JOHN HUMPHREY BARBOUR.